United States Patent [19]
Ueno et al.

[11] Patent Number: 6,020,470
[45] Date of Patent: Feb. 1, 2000

[54] WATER-SOLUBLE AZO COMPOUNDS AND PROCESS FOR PRODUCING THE SAME

[75] Inventors: Ryuzo Ueno, Nishinomiya; Masaya Kitayama, Takarazuka; Kenji Minami, Sennan; Masaharu Kittaka, Nishinomiya, all of Japan

[73] Assignee: Kabushiki Kaisha Ueno Seiyaku Oyo Kenkyujo, Osaka, Japan

[21] Appl. No.: 09/254,949

[22] PCT Filed: Aug. 25, 1998

[86] PCT No.: PCT/JP98/03750

§ 371 Date: Mar. 22, 1999

§ 102(e) Date: Mar. 22, 1999

[87] PCT Pub. No.: WO99/11717

PCT Pub. Date: Mar. 11, 1999

[30] Foreign Application Priority Data

Aug. 28, 1997 [JP] Japan ..................................... 9-232887

[51] Int. Cl.[7] ........................ C09B 62/008; C09B 62/085; D06P 1/382

[52] U.S. Cl. ........................... 534/635; 534/638; 534/642

[58] Field of Search ...................................... 534/635, 638

[56] References Cited

FOREIGN PATENT DOCUMENTS

| | | |
|---|---|---|
| 1-215862 | 8/1989 | Japan . |
| 1-254060 | 9/1989 | Japan . |
| 6-145573 | 5/1994 | Japan . |
| 98/16587 | 4/1998 | WIPO . |
| 98/17728 | 4/1998 | WIPO . |

*Primary Examiner*—Fiona T. Powers
*Attorney, Agent, or Firm*—Sughrue, Mion, Zinn, Macpeak & Seas, PLLC

[57] ABSTRACT

The present invention provides novel water-soluble azo compounds derived from 2-hydroxynaphthalene-3,6-dicarboxylic acid or derivatives thereof and diazonium salts having sulfo group(s). These compounds are useful as raw materials for dyes having excellent dyeing properties and fastness.

3 Claims, 14 Drawing Sheets

WATER-SOLUBLE AZO COMPOUNDS AND PROCESS FOR PRODUCING THE SAME

TECHNICAL FIELD

The present invention relates to novel water-soluble azo compounds and a process for preparing the same.

BACKGROUND ART

In recent years, novel pigments, dyes and the like have been actively developed in order to provide them with high added values or improved properties. Dyes are color materials having affinities for fibers, i.e., color materials having dyeing abilities, and therefore they are required to have solubility somehow or other. In that context, water-soluble azo compounds have been developed as azo dyes. As specific examples of such water-soluble azo compounds, those prepared from 2-hydroxynaphthalene-6-carboxylic acid (see, for example, the Japanese Patent Publication (Kokai) Nos. H1-215862 (1989) and H1-245060 (1989)) are known.

DISCLOSURE OF THE INVENTION

The present invention is characterized in that it provides water-soluble azo compounds having excellent dyeing properties and fastness (fastness to washing, light, rubbing, perspiration and the like). Furthermore, the present invention aims to provide water-soluble azo compounds of which color and vividness can be regulated by appropriately selecting the substituents on the molecules.

The present invention provides novel water-soluble azo compounds prepared using 2-hydroxynaphthalene-3,6-dicarboxylic acid or an ester or amide derivative thereof as a coupler, and dyes comprising the same, as well as a process for preparing such water-soluble azo compounds.

In particular, the present invention relates to a water-soluble azo compound represented by the general formula [I]:

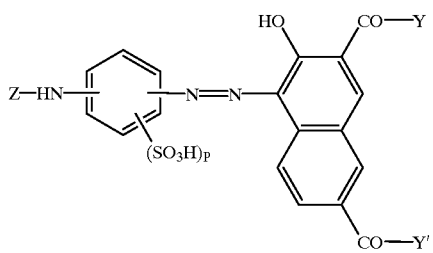

[wherein, Y is —OM, —OR1, or —NH—X and Y' is —OM', —OR1', or —NH—X', (in which M and M' each represent a hydrogen atom or an alkali metal;

R1 and R1' each represent a group selected from an optionally branched saturated or unsaturated aliphatic hydrocarbon group having 1 to 6 carbon atoms, an optionally substituted cycloalkyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM';)

p represents an integer 1 or 2;

Z is

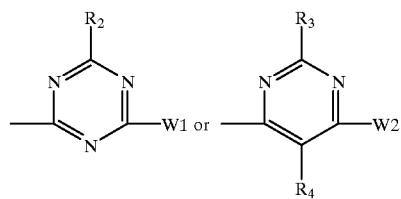

(in which R2, R3 and R4 each represent a hydrogen atom or a halogen atom; and W1 and W2 each represent a hydrogen atom, a halogen atom, or a group selected from

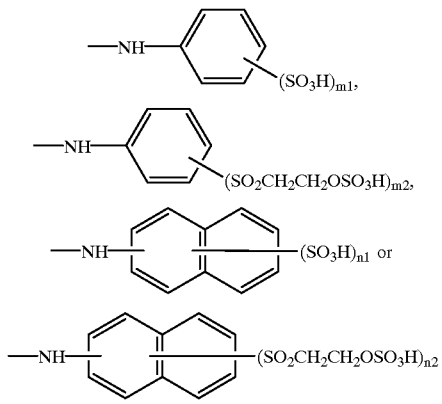

(in which the aromatic rings may optionally have further substituent(s);)

m1 and m2 each represent an integer 1 or 2, and n1 and n2 each represent an integer from 1 to 3;)] and to dyes comprising such water-soluble azo compounds.

The present invention further relates to a process for preparing a water-soluble azo compound, the process being characterized in that an amine represented by the general formula [II]:

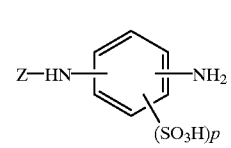

[wherein p represents an integer 1 or 2;

Z is

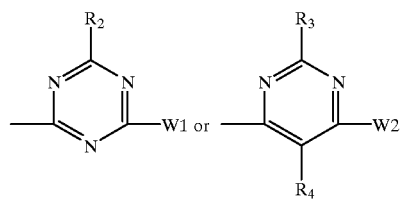

(in which R2, R3 and R4 each represent a hydrogen atom or a halogen atom; and W1 and W2 each represent a hydrogen atom, a halogen atom, or a group selected from

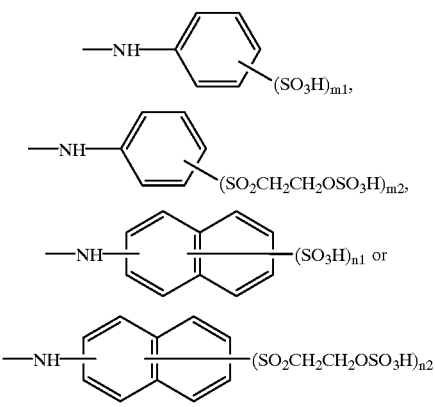

(in which the aromatic rings may optionally have further substituent(s);)

m1 and m2 each represent an integer 1 or 2, and n1 and n2 each represent an integer from 1 to 3;)] is diazotized, and the resulting diazonium compound is coupled with a compound represented by the general formula [III]:

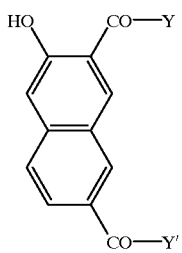

[wherein Y is —OM, —OR1, or —NH—X, and Y' is —OM', —OR1', or —NH—X', (in which M and M' each represent a hydrogen atom or an alkali metal;

R1 and R1' each represent a group selected from an optionally branched saturated or unsaturated aliphatic hydrocarbon group having 1 to 6 carbon atoms, an optionally substituted cycdoalyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM';)]

As described above, a coupler used in the present invention (a compound represented by the general formula [III]) is characteristically prepared from 2-hydroxynaphthalene-3, 6-dicarboxylic acid, or an ester or amide derivative thereof. Since such couplers have carboxyl groups or derivatives thereof at both of the 3 and 6-positions, they can confer superior dyeing properties and fastness (fastness to washing, rubbing, perspiration and the like) on the dyes, compared to hydroxynaphthalenemonocarboxylic acids having a carboxyl group at only one of the 3- and 6-positions. In addition, such couplers allow easier regulation of color and vividness by appropriately selecting the carboxyl group or derivatives thereof The carboxylic acids (wherein M or M' is a hydrogen atom) may be in the form of alkali metal salt (wherein M or M' is an alkali metal). Specific examples of such alkali metal are sodium, potassium, and lithium.

In the case of esters, i.e., when Y is —OR1 or Y' is —OR1', R1 and R1' represent an optionally branched saturated or unsaturated aliphatic hydrocarbon group having 1 to 6 carbon atoms, preferably an optionally branched saturated alkyl having 1 to 4 carbon atoms, and in particular, for example, methyl or ethyl; a cycloalkyl having 3 to 6 carbon atoms, or an aromatic group, preferably a phenyl, benzyl, or phenacyl group; and the cycloalkyl or aromatic group contained in such group may have also substituent(s). Examples of such substituents are halogen atoms, nitro, lower alkyl, lower alkoxy, cyano, phenoxy, amide, and sulfo groups.

Amides, i.e., those compounds wherein Y is —NH—X or Y' is —NH—X', may be obtained by converting the acid to acid chloride in the usual manner using, for example, thionyl chloride in a solvent such as xylene or sulfolane and then reacting the product with an amine. Alternatively, the same may also be obtained by directly reacting the acid with an amine using phosphorus trichloride, dicyclohexylcarbodiimide or the like.

Examples of amine, i.e., those compounds which constitute —NH—X or —NH—X', may include optionally substituted aromatic amino compounds such as aniline (X or X' is a phenyl group), α- or β-aminonaphthalene (X or X' is a naphthyl group), and aminoanthraquinone (X or X' is an anthraquinonyl group), optionally substituted heterocyclic amino compounds such as aminobenzimidazolone (X or X' is a benzimidazolonyl group), aminocarbazole (X or X' is a carbazolyl group), aminopyridine (X or X' is a pyridyl group), aminothiazole (X or X' is a thiazolyl group), aminobenzothiazole (X or X' is a benzothiazolyl group), and aminoimidazole X or X' is an imidazolyl group), as well as aminoindole, aminothiophene, aminoacridine, an oquinoline and the like. Examples of substituent on such compounds include halogen atoms, nitro, lower alkyl, lower alkoxy, cyano, phenyl, morpholino, phenoxy, sulfo, carboxyl, and amide (e.g., phenylaminocarbonyl) groups, and such phenoxy or amide group may have additional substituent(s). Examples of such additional substituent are halogen atom, lower alky, lower alkoxy, allylaminosulfonyl, and nitrile groups.

A water-soluble azo compound of the present invention may be obtained by diazotizing an amine represented by the general formula [II] using sodium nitrite or other agents, and coupling the diazonium compound thus obtained with the above 2-hydroxynaphthalene-3,6-dicarboxylic acid or a derivative thereof (such as a carboxamide or an ester).

In compounds of the general formula [II], although the phenylene group may be any of ortho-, meta-, and para-forms, the meta- and para-forms are preferred. The phenylene group has further one or two sulfo groups.

Z has a 1,3,5-triazine or pyrimidine nucleus. R2, R3 and R4 are each a hydrogen atom or a halogen atom, and examples of such halogen atom are fluorine, bromine, and chlorine.

W1 and W2 are each a hydrogen atom a halogen atom such as fluorine, bromine, or chlorine; a phenylamino group (having one or two sulfo or β-sulfatoethylsulfonyl groups), or an α- or β-naphthylamino group (having one, two, or three sulfo or β-sulfatoethylsulfonyl groups). The aromatic rings contained in such groups may optionally have additional substituent(s), and examples of such substituent include halogen atoms, lower alkyl lower alkoxy, and nitro groups.

The method for preparing a diazonium compound from an amine is not specifically restricted. The general method of diazotizing an amine with, for example, sodium nitrite may suitably be used.

The process in which the diazonium compound is further coupled with the above-described 2-hydroxynaphthalene-3, 6-dicarboxylic acid or a derivative thereof (for example, a carboxamide or an ester) may also be achieved in the usual manner.

Water-soluble azo compounds of the present invention may exist in the form of acid or alkali metal salt. Typically, they are isolated from the reaction mixtures as sodium or potassium salts using sodium chloride, potassium chloride or the like. They are usually used as such alkali metal salts in dyeing.

Water-soluble azo compounds of the present invention may be used as dyes for fibers and other materials.

EXAMPLE

The present invention is further described by making reference to the following Examples.

All the values for absorption maximum ($\lambda$hd max) reported in Examples were measured using an aqueous solution of the compound isolated as an alkali metal salt.

Example 1 a) To about 100 g of water, 18.2 g of sulfanilic acid was added, and dissolved by adjusting the pH to about 6 with 10% aqueous $NaHCO_3$ solution. The solution was poured into a suspension consisting of 160 g of ice-water and 20 g of cyanuric chloride, and stirred at 0 to 5° C. with ice-cooling until the sulfanilic acid became no longer detectable. During this reaction, the pH was maintained at 3.5 to 4.5 with 10% aqueous $NaHCO_3$ solution.

b) To about 100 g of water, 18.8g of m-phenylenediamine4-sulfonic acid was added, and dissolved by adjusting the pH to 6–7 with 10% aqueous $NaHCO_3$ solution. Into this solution, the reaction mixture obtained in a) was poured, warmed to 40° C., and stirred until the m-phenylenediamine4-sulfonic acid became no longer detectable. During this reaction, the pH was maintained at 5 to 6 with 10% aqueous NaHCO3 solution.

c) Into the condensation mixture obtained in b), 26.6 g of 35% HCl and 200 g of water were added, and a aqueous solution of 7 g of sodium nitrite was then added dropwise with ice-cooling to achieve diazotization. This diazotization mixture was added dropwise into an aqueous coupler solution consisting of 30.7 g of 2-hydroxy-3-phenylaminocarbonyl-6-hydroxycarbonylnaphthalene and 80.0 g of 10% NaOH in 300 g of water to carry out the coupling reaction in the usual manner. Stirring was continued for several hours until the coupling reaction completed. The resulting monoazo compound indicated as formula (1) was isolated by salting out with sodium chloride and filtration to obtain 90.3 g of dark red powdery crystals including sodium chloride.

This compound has excellent fiber-reactive dye properties, and thereby dyed cellulose fiber materials, for example cotton, by the usual dyeing procedures in deep red exhibiting high fastness to chlorine, light, alkaline perspiration, and rubbing.

Figure 1:
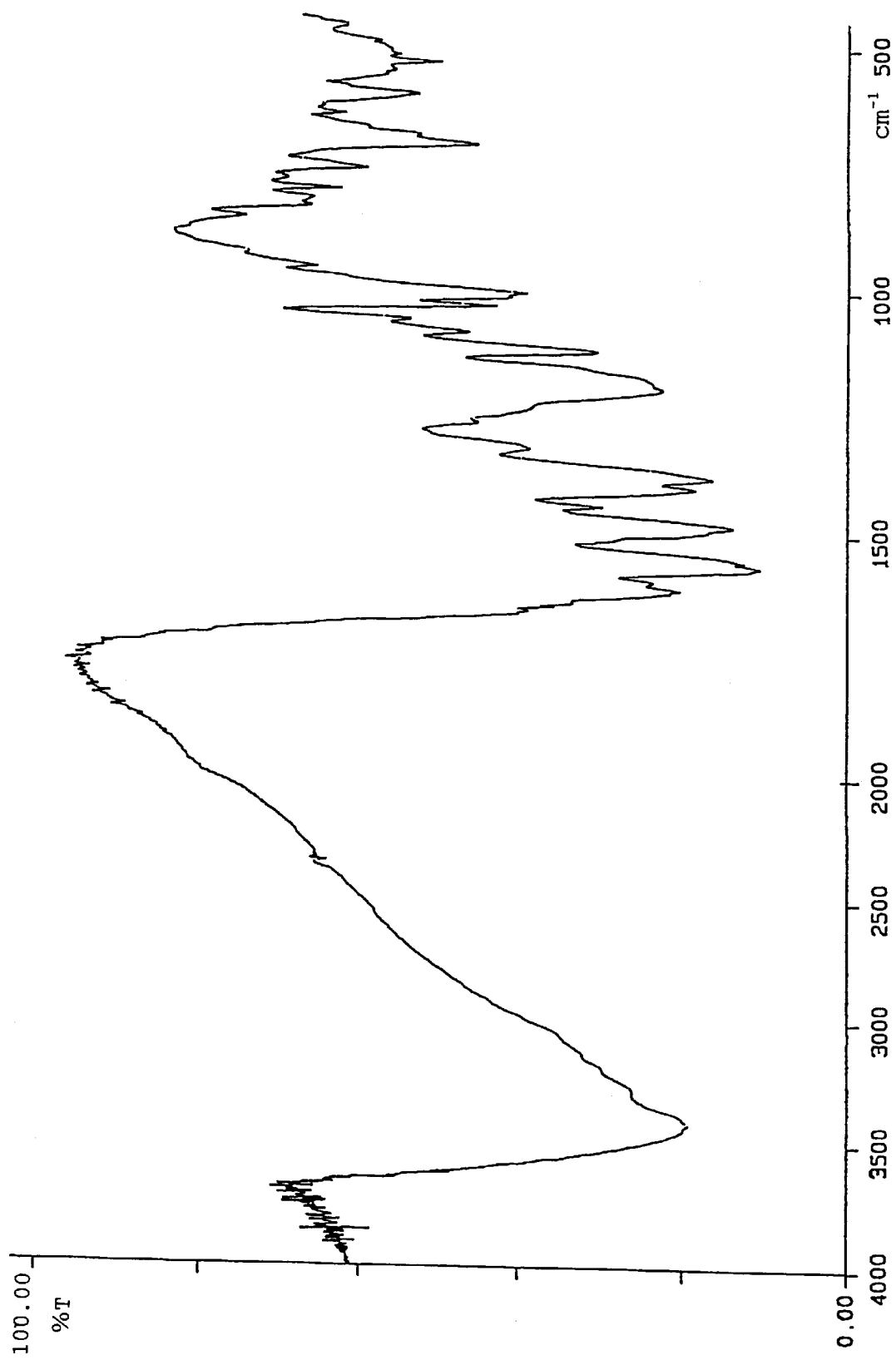
FIG. 1 is an infrared absorption spectrum of the azo compound obtained in Example 1.

An infrared absorption spectrum (the KBr method) of the dark red powdery crystals thus obtained is shown in FIG. 1.

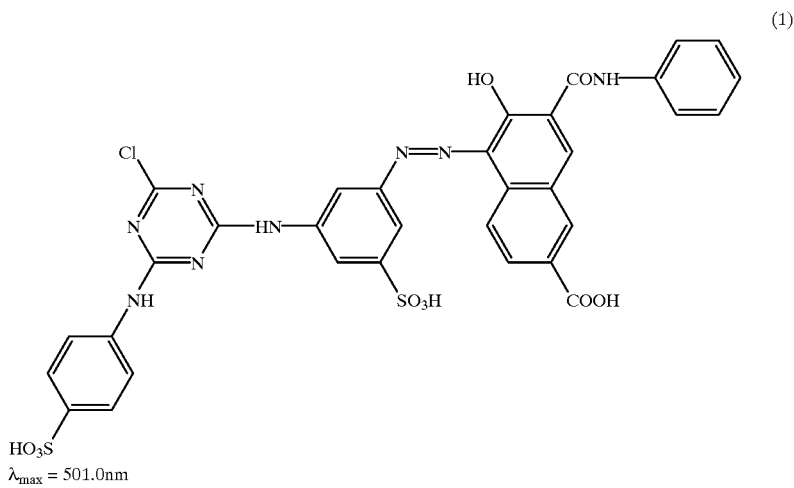

(1)

$\lambda_{max} = 501.0$ nm

The following are the results of evaluations and the methods of dyeing and testing in which the dark red powdery crystals obtained in Example 1 were used.

TABLE 1

Evaluation results

| chlorine fastness 20 ppm | light fastness 10 hr. | light fastness 20 hr. | alkaline perspiration fastness | rub fastness |
|---|---|---|---|---|
| 4–3 | 5 | 4 | 1: discoloration of dyed cloth<br>2: staining of cotton cloth<br>1: 5<br>2: 4 | 1: dry<br>2: wet<br>1: 5<br>2: 4 |

Dyeing

Dyeing was carried out on unmercerized cotton cloth. The amount of dye used in the dyeing was 3% based on the weight of the cotton cloth. The dyeing conditions were as follows:

| | |
|---|---|
| bath ratio | 15:1 |
| dyeing conditions | at 80° C. for 60 minutes |
| dyeing assistants | mirabilite 70 g/l<br>soda ash 20 g/l |
| washing | nonionic surfactant 2 g/l<br>boiled for 10 minutes at a bath ratio of 15:1. |

Test for Assessing Chlorine Fastness

[Treating conditions] A test sample is immersed in a chlorine solution having an effective concentration of 20 ppm at a bath ratio of 100:1 for 4 hours at 27° C.

[Evaluation] The test sample is evaluated on a one-to-five scale using a grey scale for assessing change in color which complies JIS L 0804.

Test for Assessing Light Fastness

After 10 or 20 hours irradiation with a xenon lump, discoloration is evaluated on a one-to-eight scale using a blue scale which complies JIS L 0841.

Resistance to Alkaline Perspiration

A composite test piece consisting of a piece of dyed cloth sandwiched between a piece of cotton cloth and a piece of nylon cloth both undyed is put into a container of an alkaline artificial perspiration solution (bath ratio=50: 1) to wet it completely, and immersed therein for 30 minutes at room temperature. The composite test piece is pressed and moved at times in order to thoroughly permeate it with the test solution.

The test solution is then drained, and the composite test piece is squeezed by pinching it between two glass rods until the excess of test solution no longer drips.

The composite test piece is sandwiched between two glass or hard plastic sheets, set on a perspiration tester, and subjected to a force of about 45 kgf (44.1 N). The perspiration tester is then put in an oven so that the composite test piece set on the perspiration tester is maintained perpendicular to the bottom of the oven. After retaining in the oven at 37±2° C. for 4 hours, the composite test piece is removed from the perspiration tester. The test piece and the two pieces of white cloth attached thereto (unmercerized cotton cloth and nylon cloth) are separated from each other, and dried in air at 60° C. or below. (This procedure is carried out in conformity with JIS L 0848.)

| Composition of alkaline artificial perspiration solution | |
|---|---|
| L-histidine hydrochloride (monohydrate) | 0.5 g |
| sodium chloride | 5 g |
| disodium hydrogenphosphate (dodecahydrate) | 5 g | bring to a total volume of one liter at pH 8 by adding about 25 ml of N/10 aqueous sodium hydroxide and an appropriate amount of distilled water.

[Evaluation] Change in color of the cloth originally dyed is evaluated on a one-to-five scale using a grey scale for assessing change in color which complies JIS L 0804. Staining on each of the attached white cloths is evaluated on a one-to-five scale using a grey scale for assessing staining which complies JIS L 0805.

Fastness to Rubbing

The tests are carried out under dry and wet conditions, and migration of the dye onto white cloth from the dyed cloth due to rubbing is evaluated on a one-to-five scale using a grey scale for assessing staining which complies JIS L 0805. (These tests are carried out in conformity with JIS L 0849.)

In all the evaluations described above, higher values indicate superior properties.

Example 2

A monoazo compound represented by formula (2) was prepared as described in Example 1 with the exceptions that 2-hydroxy-3-hydroxycarbonyl-6-phenylaminocarbonyl-naphthalene was substituted for the 2-hydroxy-3-phenylaminocarbonyl-6-hydroxycarbonylnaphthalene used in c) of Example 1 and that 600 g of 50% aqueous methanol solution was substituted for 300 g of water used in preparation of the aqueous coupler solution. The product was isolated by salting out with sodium chloride and filtration to yield 52.7 g of red powdery crystals including sodium chloride.

This compound has excellent fiber-reactive dye properties, and thereby dyed cellulose fiber materials, for example cotton, by the usual dyeing procedures in deep yellowish red exhibiting high fastness to chlorine, light, alkaline perspiration, and rubbing.

Figure 2:
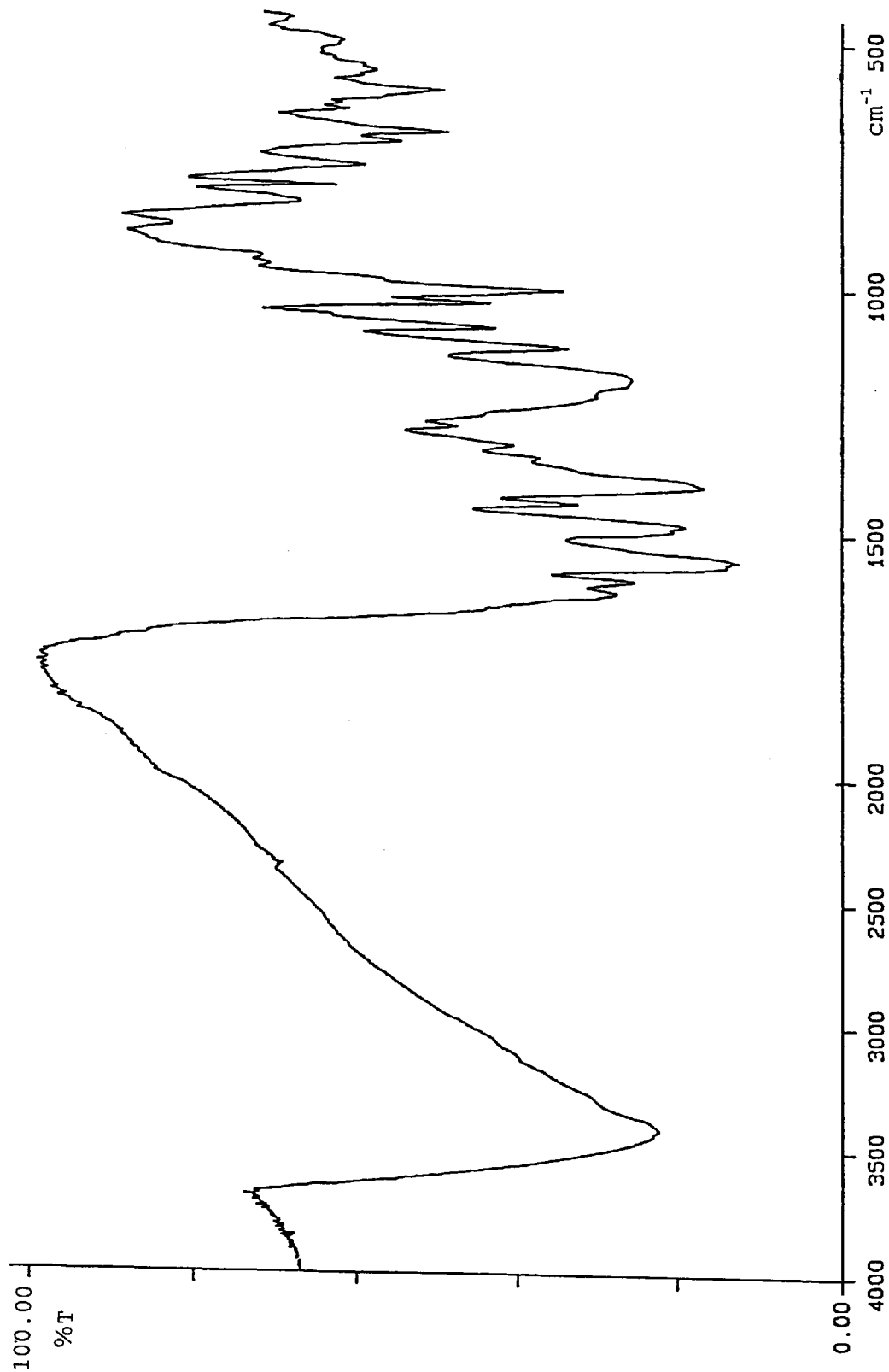
FIG. 2 is an infrared absorption spectrum of the azo compound obtained in Example 2.

An infrared absorption spectrum (the KBr method) of the red powdery crystals thus obtained is shown in FIG. 2.

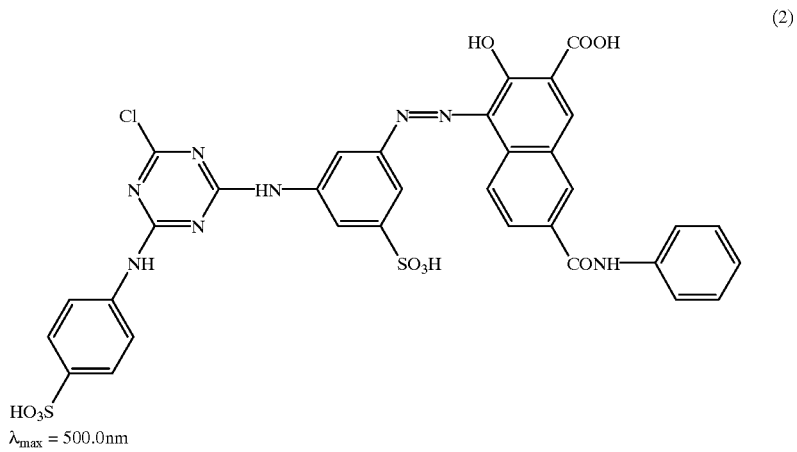

(2)

λ_max = 500.0nm

Example 3

A monoazo compound represented by formula (3) was prepared as described in Example 1 with the exceptions that 23.2 g of 2-hydroxy-3,6-dihydroxycarbonylnaphthalene was substituted for the 2-hydroxy-3-phenylaminocarbonyl-6-hydroxycarbonylnaphthalene in c) of Example 1 and that 168.0 g of 10% aqueous NaHCO₃ solution was substituted for 80.0 g of 10% aqueous NaOH solution. The product was isolated by salting out with sodium chloride and filtration to yield 42.0 g of dark red powdery crystals including sodium chloride.

This compound has excellent fiber-reactive dye properties, and thereby dyed cellulose fiber materials, for example cotton, by the usual dyeing procedures in deep bright reddish orange exhibiting high fastness to chlorine, light, alkaline perspiration, and rubbing.

Figure 3:
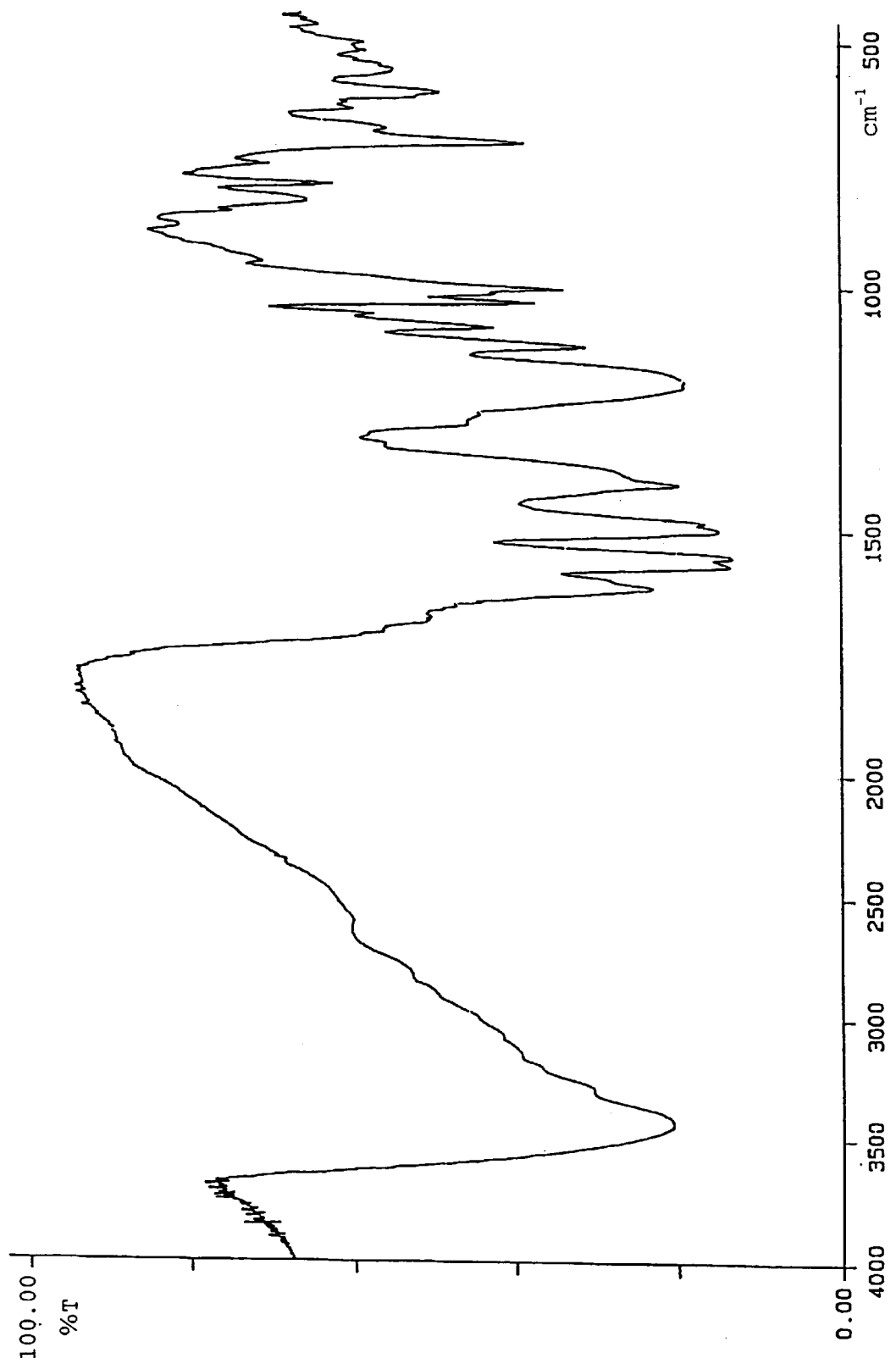
FIG. 3 is an infrared absorption spectrum of the azo compound obtained in Example 3.

An infrared absorption spectrum (the KBr method) of the dark red powdery crystals thus obtained is shown in FIG. 3.

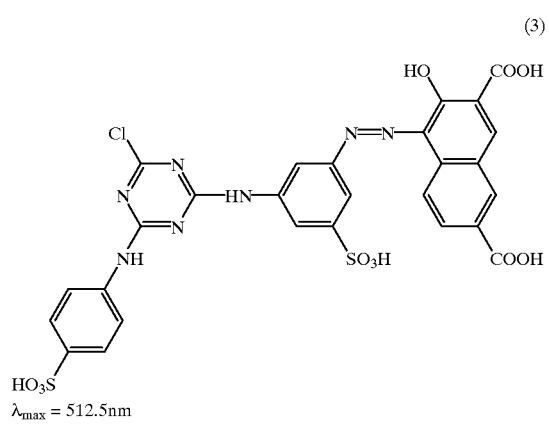

(3)

λ_max = 512.5nm

Example 4

A diazotization mixre was obtained as described in Example 1 with the exception that 34.2 g of amino-R acid monosodium salt was substituted for 18.2 g of sulfanilic acid in a) of Example 1, and the diazotization mixture was added dropwise to an aqueous coupler solution consisting of 30.7 g of 2-hydroxy-3-phenylaminocarbonyl-6-hydroxycarbonylnaphthalene and 80.0 g of 10% NaOH in 300 g of water to carry out the coupling reaction in the usual manner. Stirring was continued for several hours until the coupling reaction completed.

The resulting monoazo compound represented by formula (4) was isolated by salting out with sodium chloride and filtration to obtain 81.2 g of red powdery crystals including sodium chloride.

This compound has excellent fiber-reactive dye properties, and thereby dyed cellulose fiber materials, for example cotton, by the usual dyeing procedures in deep red exhibiting high fastness to chlorine, light, alkaline perspiration, and rubbing.

Figure 4:
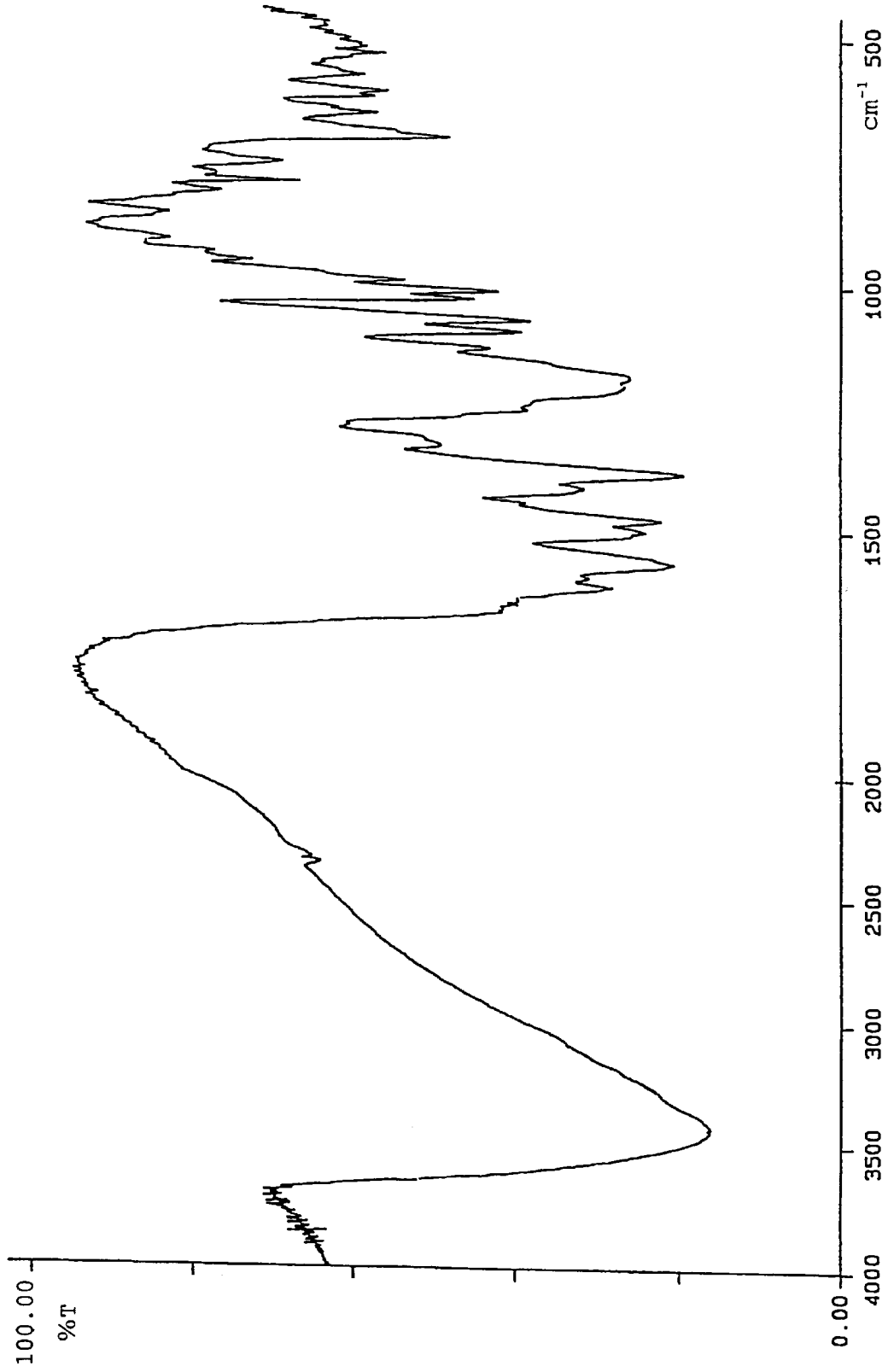
FIG. 4 is an infrared absorption spectrum of the azo compound obtained in Example 4.

An infrared absorption spectrum (the KBr method) of the red powdery crystals thus obtained is shown in FIG. 4.

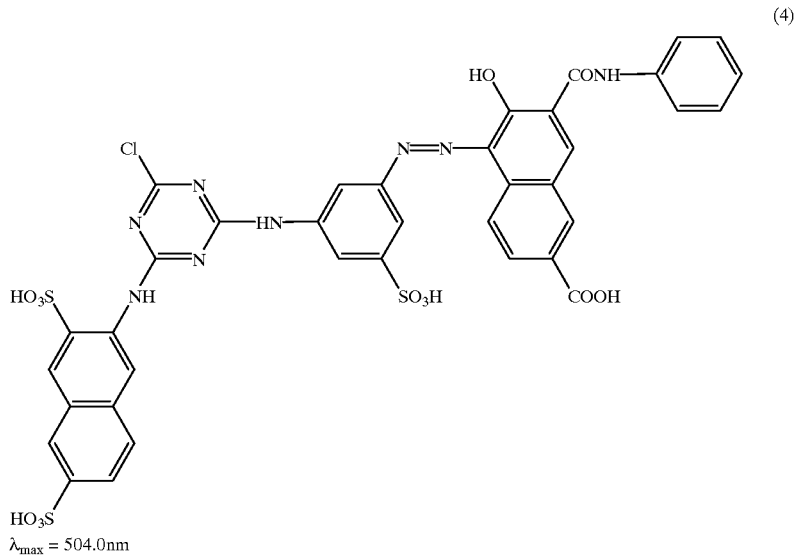

$\lambda_{max} = 504.0$ nm

Example 5

A monoazo compound represented by formula (5) was prepared as described in Example 4 with the exceptions that 2-hydroxy-3-hydroxycarbonyl-6-phenylaminocarbonyl-naphthalene was substituted for the 2-hydroxy-3-phenylaminocarbonyl-6-hydroxycarbonylnaphthalene used in Example 4 and that 600 g of 50% aqueous methanol solution was substituted for 300 g of water used in preparation of the aqueous coupler solution. The product was isolated by salting out with sodium chloride and filtration to obtain 104.7 g of red powdery crystals including sodium chloride.

This compound has excellent fiber-reactive dye properties, and thereby dyed cellulose fiber materials, for example cotton, by the usual dyeing procedures in deep bright red exhibiting high fastness to chlorine, light, alkaline perspiration, and rubbing.

Figure 5:
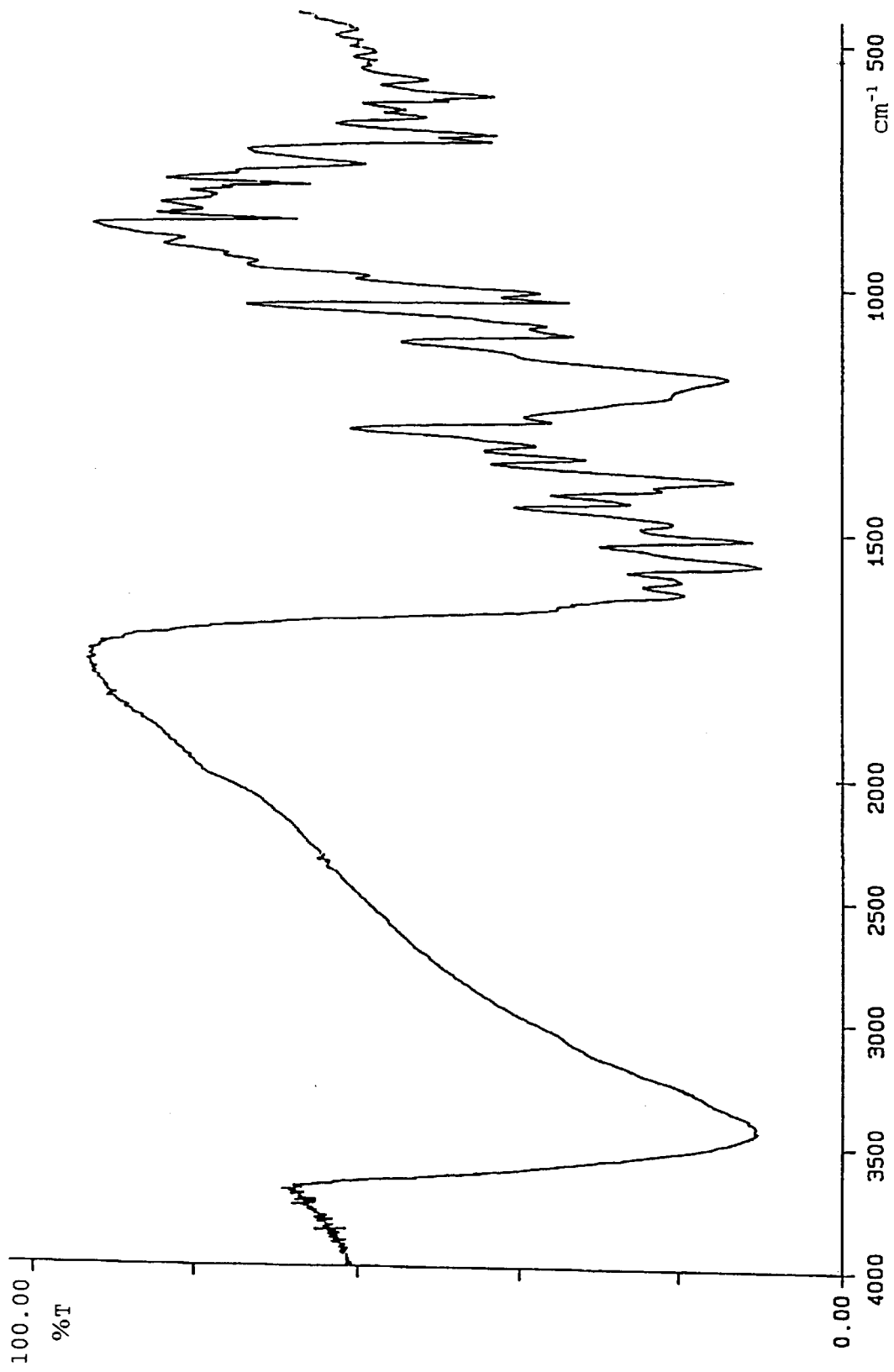
FIG. 5 is an infrared absorption spectrum of the azo compound obtained in Example 5.

An infrared absorption spectrum (the KBr method) of the red powdery crystals thus obtained is shown in FIG. 5.

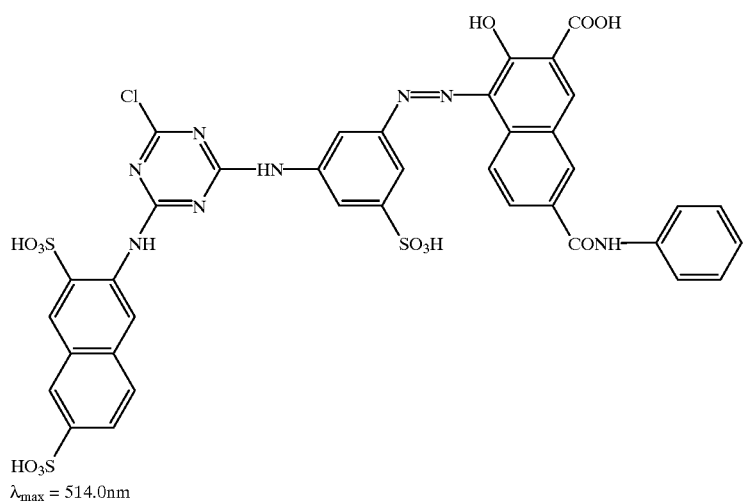

$\lambda_{max} = 514.0$ nm

Example 6

A monoazo compound represented by formula (6) was prepared as described in Example 4 with the exceptions that 23.2 g of 2-hydroxy-3,6-dihydroxycarbonylnaphthalene was substituted for the 2-hydroxy-3-phenylaminocarbonyl-6-hydroxycarbonylnaphthalene in Example 4 and that 168.0 g of 10% aqueous $NaHCO_3$ solution was substituted for 80.0 g of 10% aqueous NaOH solution. The product was isolated by salting out with sodium chloride and filtration to obtain 140.0 g of red powdery crystals including sodium chloride.

This compound has excellent fiber-reactive dye properties, and thereby dyed cellulose fiber materials, for example cotton, by the usual dyeing procedures in deep bright red exhibiting high fastness to chlorine, light, alkaline perspiration, and rubbing.

Figure 6:
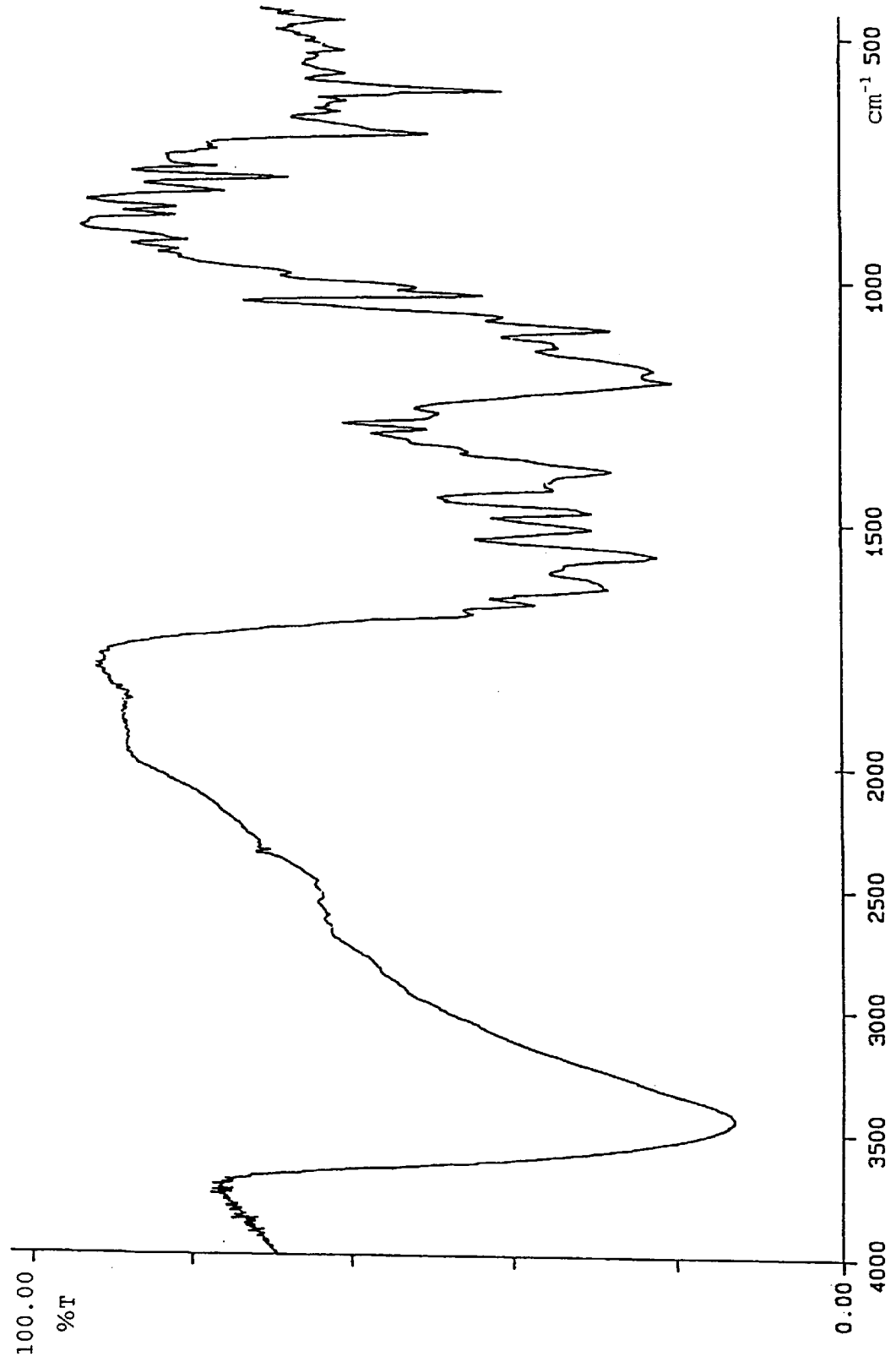
FIG. 6 is an infrared absorption spectrum of the azo compound obtained in Example 6.

An infrared absorption spectrum (the KBr method) of the red powdery crystals thus obtained is shown in FIG. 6.

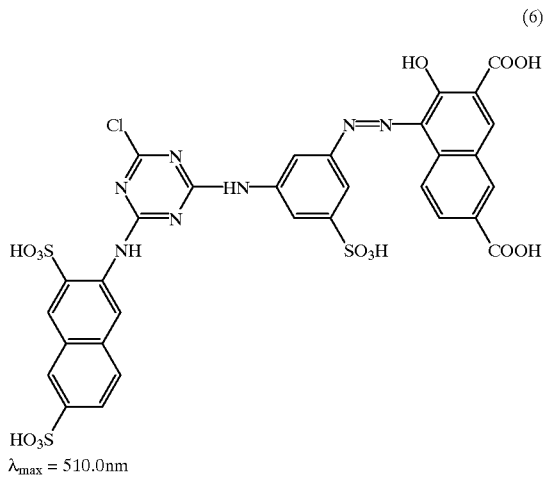

$\lambda_{max} = 510.0 nm$

Example 7 a) To about 60 g of water, 4.25 g of m-phenylenediamnine4-sulfonic acid was added, and dissolved by adjusting the pH to about 6 with 10% aqueous $NaHCO_3$ solution. With stirring at 0 to 5 ° C. with ice-cooling, 5.0 g of 5-chloro-2,4,6-trifluoropyrimidine was added gradually, and stirring was continued until the m-phenylenediaminesulfonic acid became no longer detectable. During this reaction, the pH was maintained at 6 to 6.5 with 10% aqueous $NaHCO_3$ solution.

b) To the condensation mixture obtained in a), 4.59 g of 35% HCl was added, and an aqueous solution of 1.17 g of sodium nitrite was added dropwise with ice-cooling to achieve diazotization. This diazotization mixture was added dropwise to an aqueous coupler solution consisting of 6.94 g of 2-hydroxy-3-phenylamninocarbonyl-6-hydroxycarbonylnaphthalene and 9.04 g of 10% NaOH in 60 g of water to carry out the coupling reaction in the usual manner. Stirring was continued for several hours until the coupling reaction completed.

The resulting monoazo compound represented by formula (7) was isolated by salting out with sodium chloride and filtration to obtain 17.3 g of red powdery crystals including sodium chloride.

This compound has excellent fiber-reactive dye properties, and thereby dyed cellulose fiber materials, for example cotton, by the usual dyeing procedures in deep red exhibiting high fastness to chlorine, light, alkaline perspiration, and rubbing.

Figure 7:
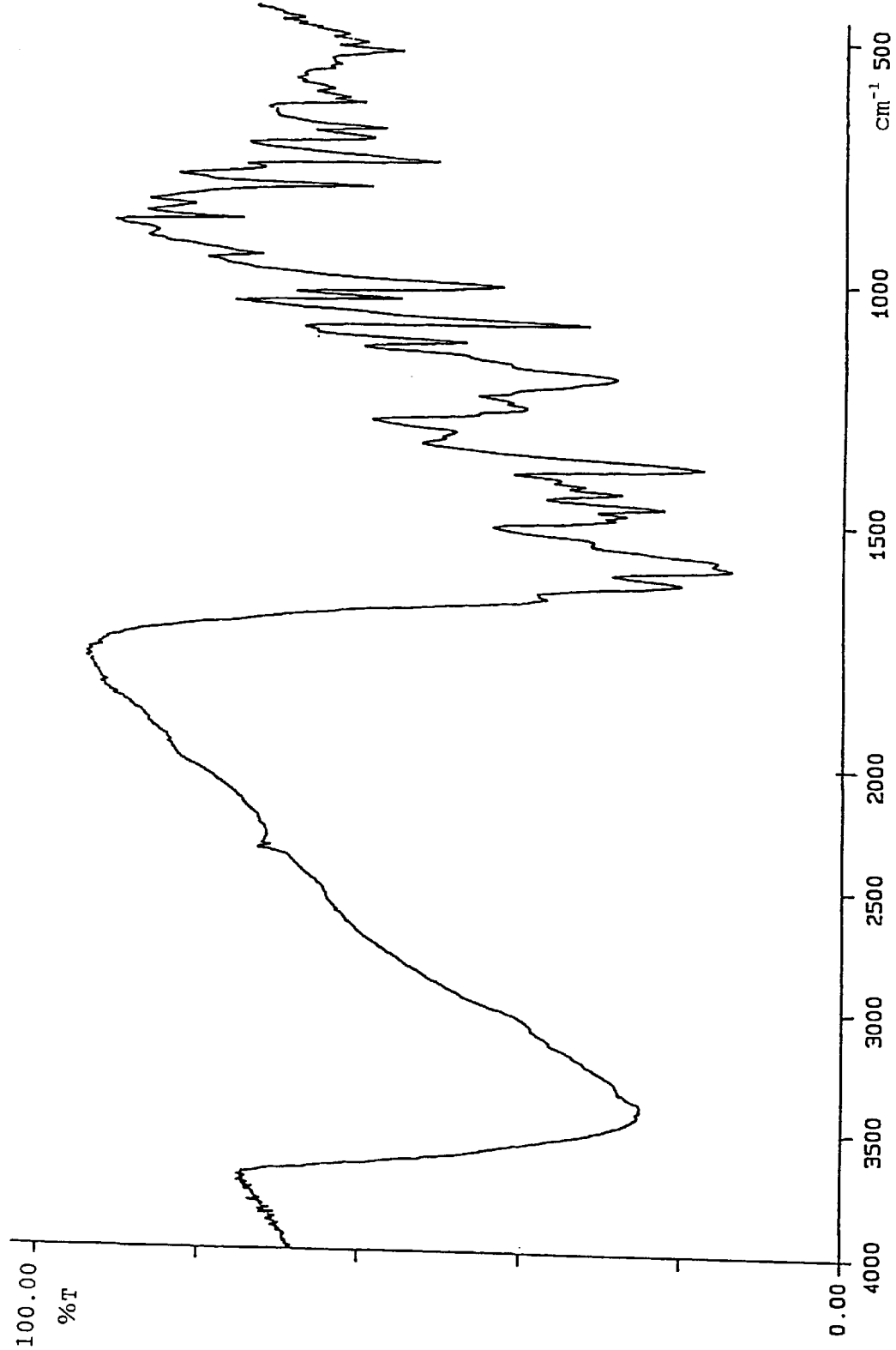
FIG. 7 is an infrared absorption spectrum of the azo compound obtained in Example 7.

An infrared absorption spectrum (the KBr method) of the red powdery crystals thus obtained is shown in FIG. 7.

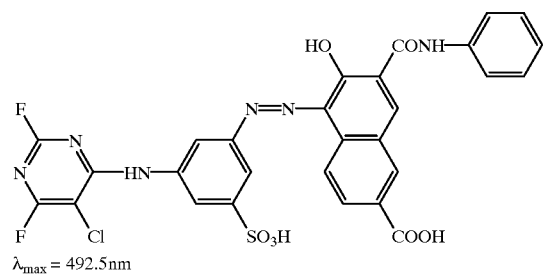

$\lambda_{max} = 492.5 nm$

Example 8

A monoazo compound represented by formula (8) was prepared as described in Example 7 with the exceptions that 2-hydroxy-3-hydroxycarbonyl-6-phenylaminocarbonyl-naphthalene was substituted for the 2-hydroxy-3-phenylaminocarbonyl-6-hydroxycarbonylnaphthalene in b) of Example 7 and that 120.0 g of 50% aqueous methanol solution was substituted for 60.0g g of water used in preparation of the aqueous coupler solution. The product was isolated by salting out with sodium chloride and filtration to obtain 14.4 g of red powdery crystals including sodium chloride.

This compound has excellent fiber-reactive dye properties, and thereby dyed cellulose fiber materials, for example cotton, by the usual dyeing procedures in deep yellowish red exhibiting high fastness to chlorine, light, alkaline perspiration, and rubbing.

Figure 8:
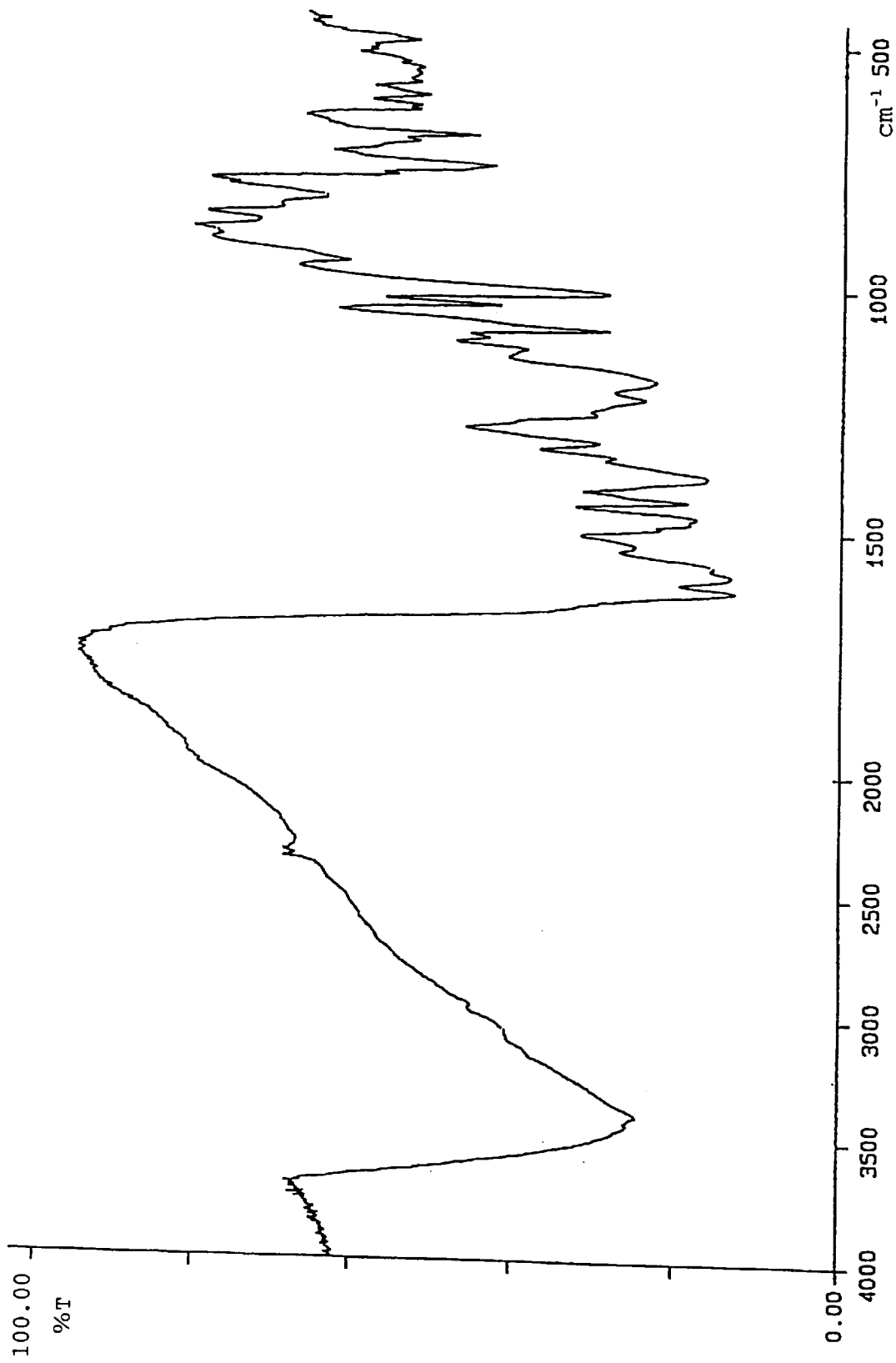
FIG. 8 is an infrared absorption spectrum of the azo compound obtained in Example 8.

An infrared absorption spectrum (the KBr method) of the red powdery crystals thus obtained is shown in FIG. 8.

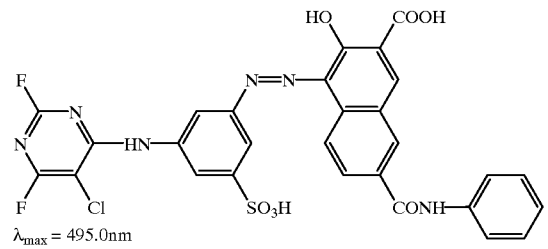

$\lambda_{max} = 495.0 nm$

Example 9

A monoazo compound represented by formula (9) was prepared as described in Example 7 with the exception that 5.24 g of 2-hydroxy-3,6-dihydroxycarbonylnaphthalene was substituted for the 2-hydroxy-3-phenylaminocarbonyl-6-hydroxycarbonylnaphthalene in b) of Example 7, and the product was isolated by salting out with sodium chloride and filtration to obtain 14.4 g of red powdery crystals including sodium chloride.

This compound has excellent fiber-reactive dye properties, and thereby dyed cellulose fiber materials, for example cotton, by the usual dyeing procedures in deep reddish orange exhibiting high fastness to chlorine, light, alkaline perspiration, and rubbing.

Figure 9:
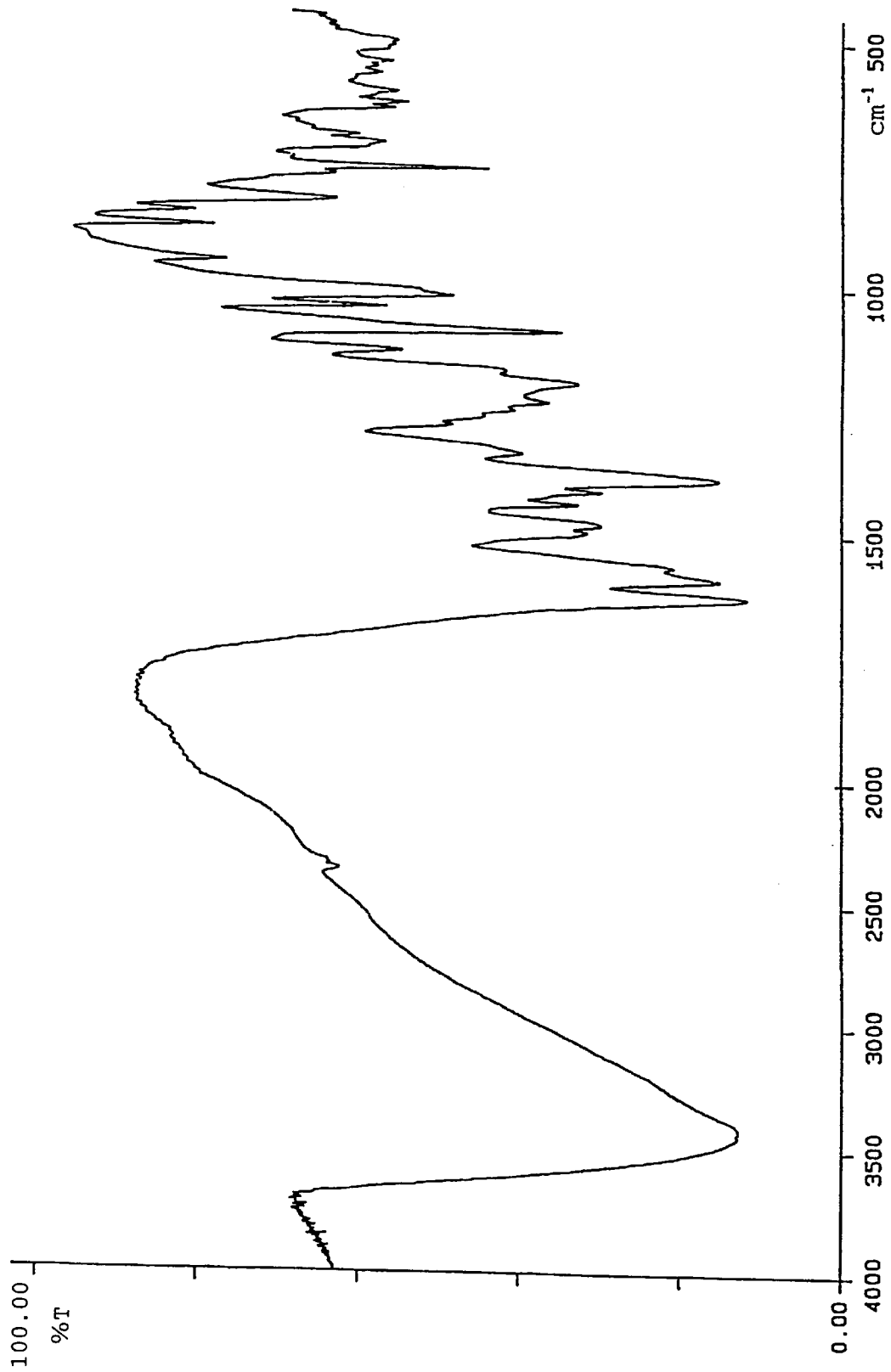
FIG. 9 is an infrared absorption spectrum of the azo compound obtained in Example 9.

An infrared absorption spectrum (the KBr method) of the red powdery crystals thus obtained is shown in FIG. 9.

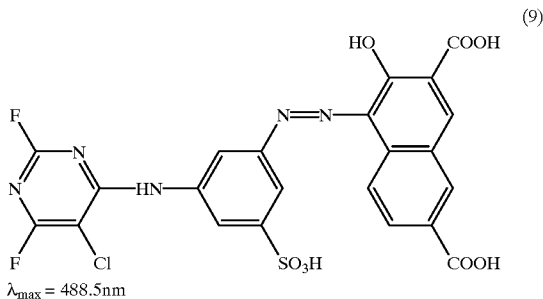

(9)

$\lambda_{max}$ = 488.5nm

Example 10

A monoazo compound represented by formula (10) was prepared as described in Example 1 with the exception that 40.0 g of 2-hydroxy-3-(4-diphenyl ether)aminocarbonyl-6-hydroxycarbonylnaphthalene was substituted for the 2-hydroxy-3-phenylaminocarbonyl-6-hydroxycarbonyl-naphthalene in c) of Example 1, and the product was isolated by salting out with sodium chloride and filtration to obtain 42.6 g of red powdery crystals including sodium chloride.

This compound has excellent fiber-reactive dye properties, and thereby dyed cellulose fiber materials, for example cotton, by the usual dyeing procedures in deep yellowish red exhibiting high fastness to chlorine, light, alkaline perspiration, and rubbing.

Figure 10:
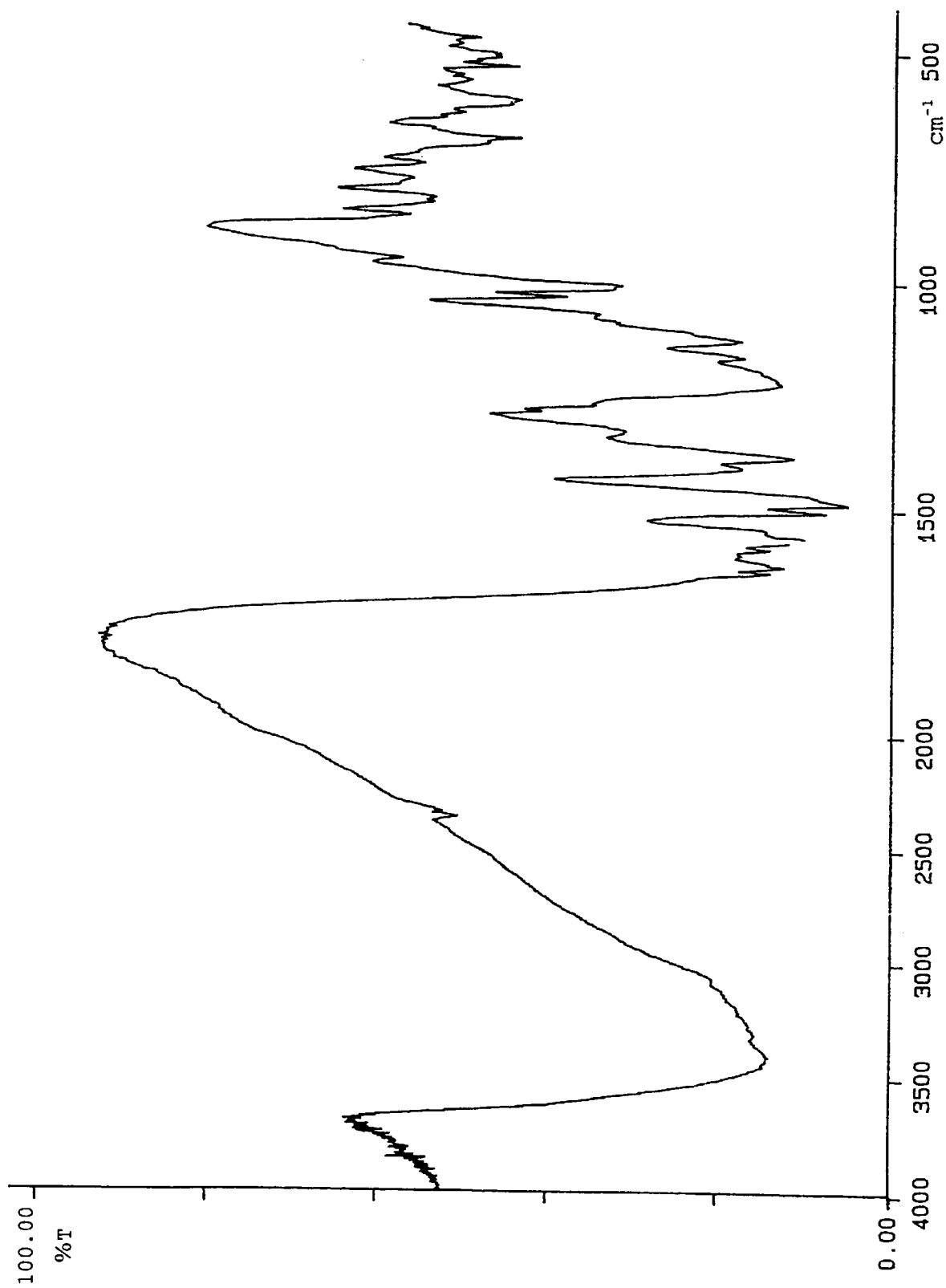
FIG. 10 is an infrared absorption spectrum of the azo compound obtained in Example 10.

An infrared absorption spectrum (the Knr method) of the red powdery crystals thus obtained is shown in FIG. 10.

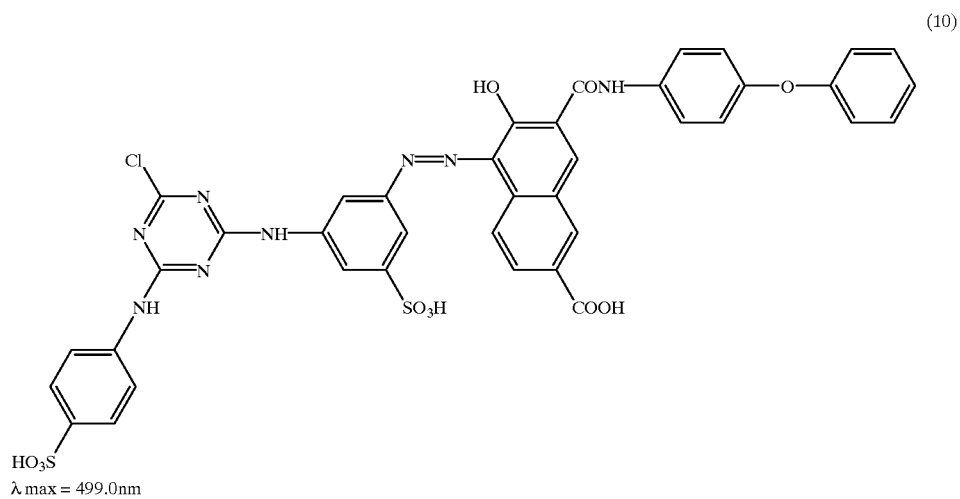

(10)

$\lambda$ max = 499.0nm

Example 11

A monoazo compound represented by formula (11) was prepared as described in Example 1 with the exception that 36.4 g of 2-hydroxy-6-hydroxycarbonyl-3-(1-naphthyl)aminocarbonylnaphthalene was substituted for the 2-hydroxy-3-phenylaminocarbonyl-6-hydroxycarbonyl-naphthalene in c) of Example 1, and the product was isolated by salting out with sodium chloride and filtration to obtain 160.0 g of red powdery crystals including sodium chloride.

This compound has excellent fiber-reactive dye properties, and thereby dyed cellulose fiber materials, for example cotton, by the usual dyeing procedures in deep bluish red exhibiting high fastness to chlorine, light, alkaline perspiration, and rubbing.

Figure 11:
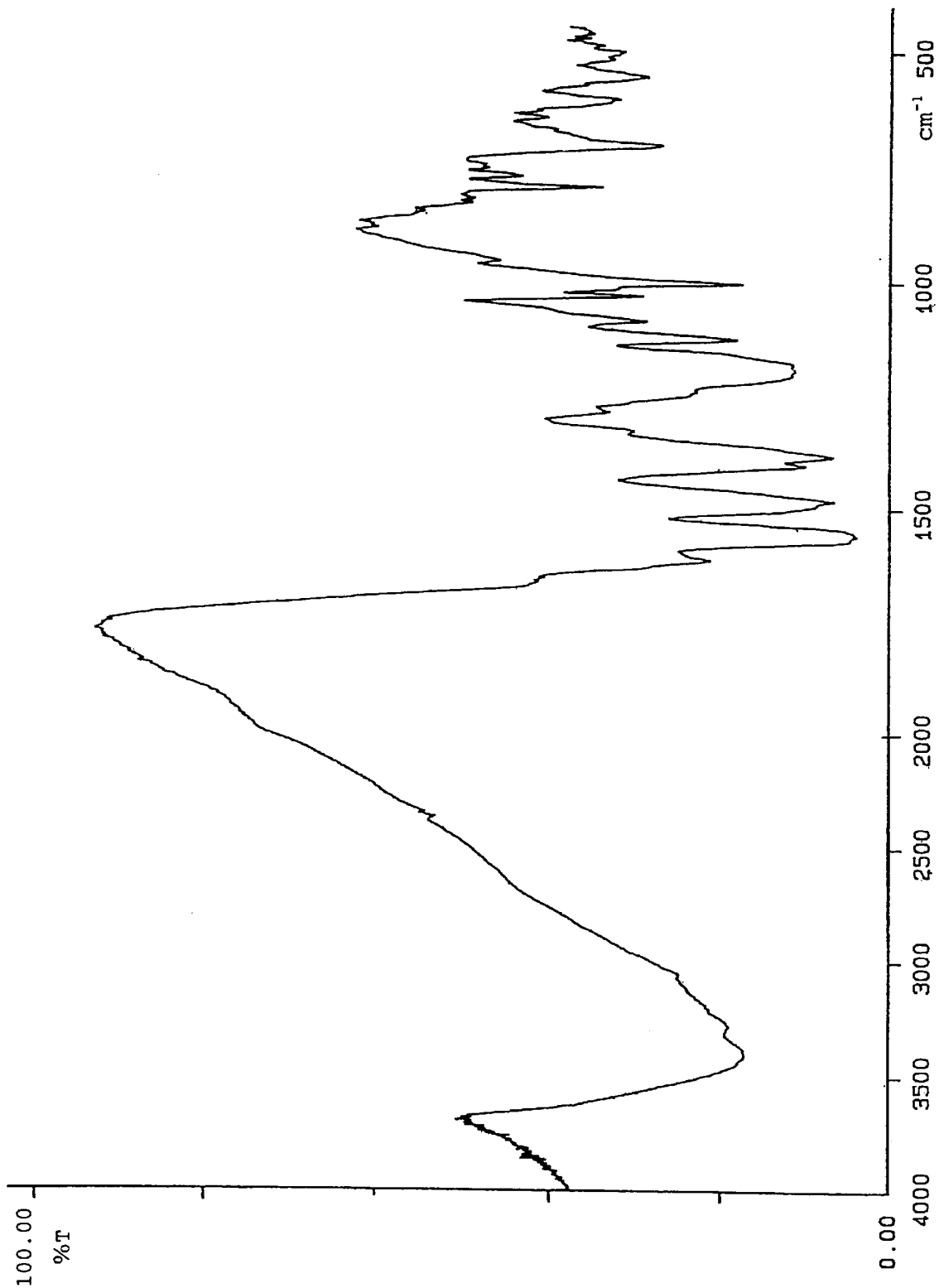
FIG. 11 is an infrared absorption spectrum of the azo compound obtained in Example 11.

An infrared absorption spectrum (the KBr method) of the red powdery crystals thus obtained is shown in FIG. 11.

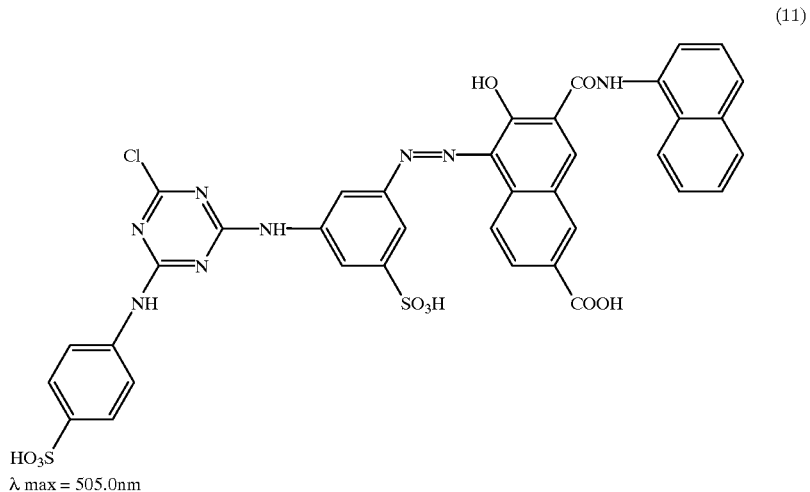

(11)

λ max = 505.0nm

Example 12

A monoazo compound represented by formula (12) was prepared as described in Example 1 with the exceptions that 30.8 g of 2-hydroxy-6-hydroxycarbonyl-3-(2-pyridyl)aminocarbonylnaphthalene was substituted for the 2-hydroxy-3-phenylaminocarbonyl-6-hydroxycarbonyl-naphthalene in c) of Example 1 and that 500 g of 50% aqueous solution of 1-methyl-2-pyrrolidone was substituted for 300 g of water used in preparation of the aqueous coupler solution. The product was isolated by salting out with sodium chloride and filtration to obtain 132.0 g of red powdery crystals including sodium chloride.

This compound has excellent fiber-reactive dye properties, and thereby dyed cellulose fiber materials, for example cotton, by the usual dyeing procedures in pale yellowish red exhibiting high fastness to chlorine, light, alkaline perspiration, and rubbing.

Figure 12:
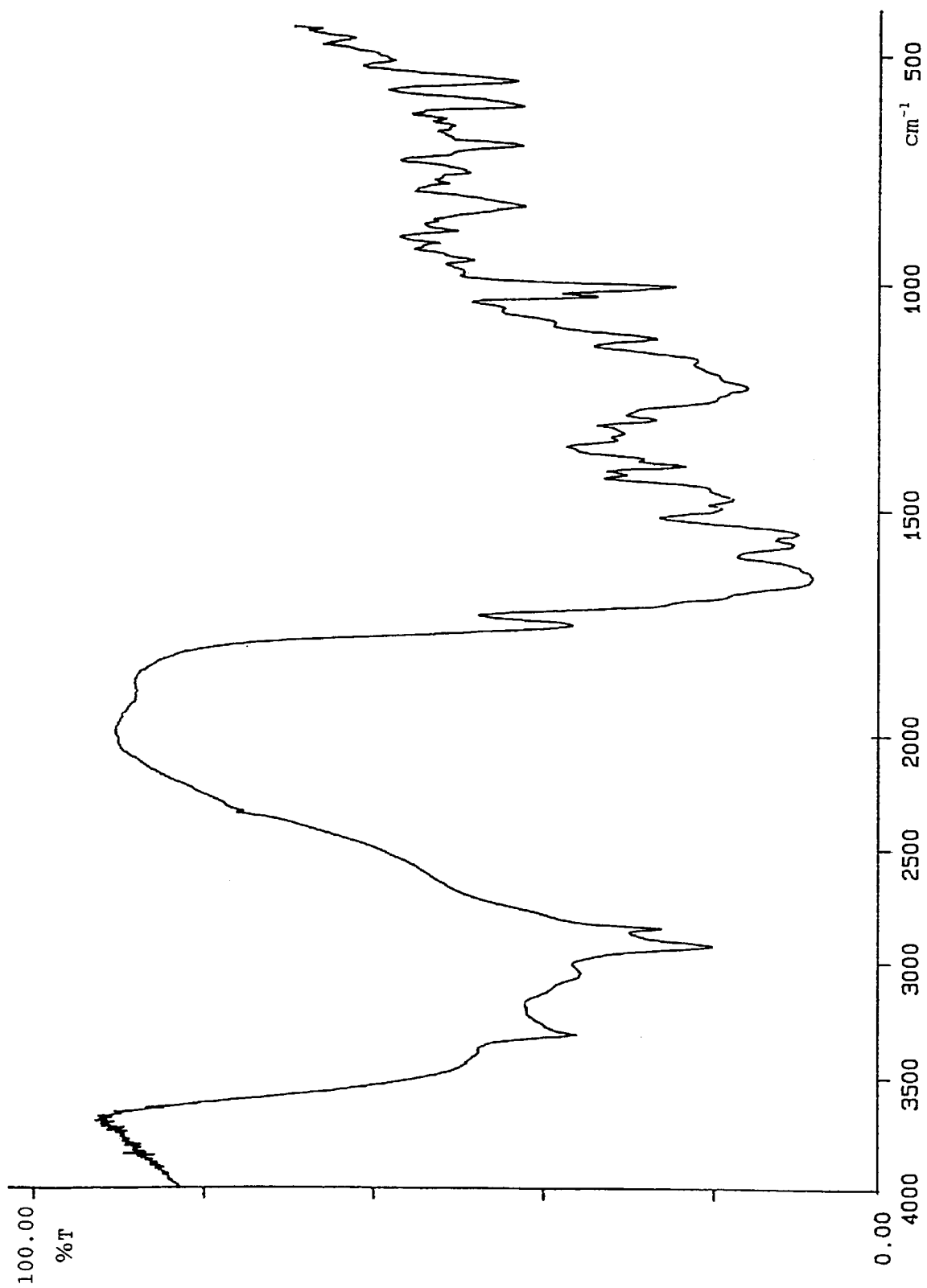
FIG. 12 is an infrared absorption spectrum of the azo compound obtained in Example 12.

An infrared absorption spectrum (the KBr method) of the red powdery crystals thus obtained is shown in FIG. 12.

Example 13

A monoazo compound represented by formula (13) was prepared as described in Example 1 with the exceptions that 43.7 g of 2-hydroxy-3-(2-anthraquinolyl)aminocarbonyl-6-hydroxycarbonylnaphthalene was substituted for the 2-hydroxy-3-phenylaminocarbonyl-6-hydroxycarbonyl-naphthalene in c) of Example 1 and that 700 g of 50% aqueous solution of 1-methyl-2-pyrrolidone was substituted for 300 g of water used in preparation of the aqueous coupler solution. The product was isolated by salting out with sodium chloride and filtration to obtain 112.0 g of brown powdery crystals including sodium chloride.

This compound has excellent fiber-reactive dye properties, and thereby dyed cellulose fiber materials, for example cotton, by the usual dyeing procedures in pale yellowish brown exhibiting high fastness to chlorine, light, alkaline perspiration, and rubbing.

Figure 13:
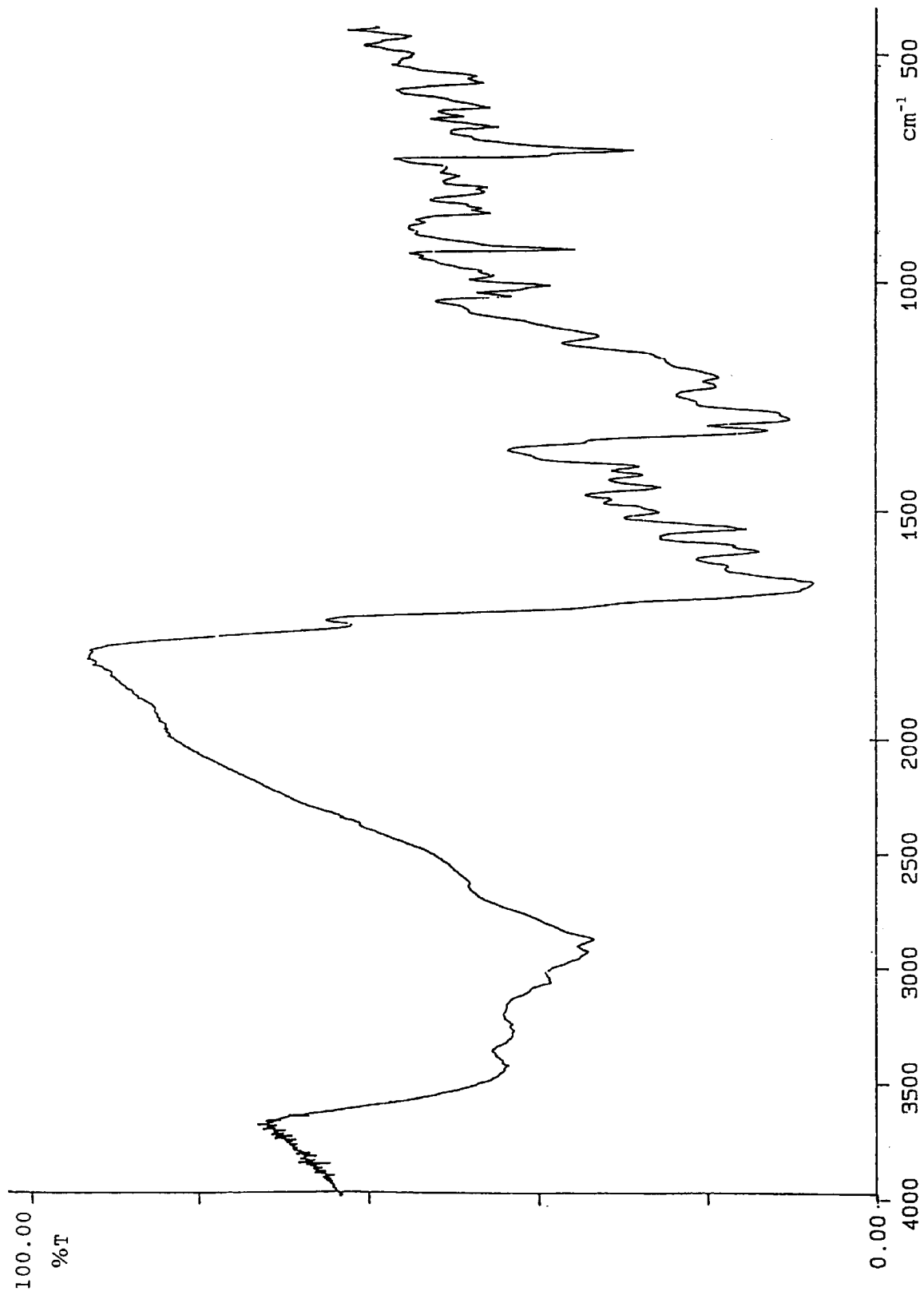
FIG. 13 is an infrared absorption spectrum of the azo compound obtained in Example 13.

An infrared absorption spectrum (the KBr method) of the red powdery crystals thus obtained is shown in FIG. 13.

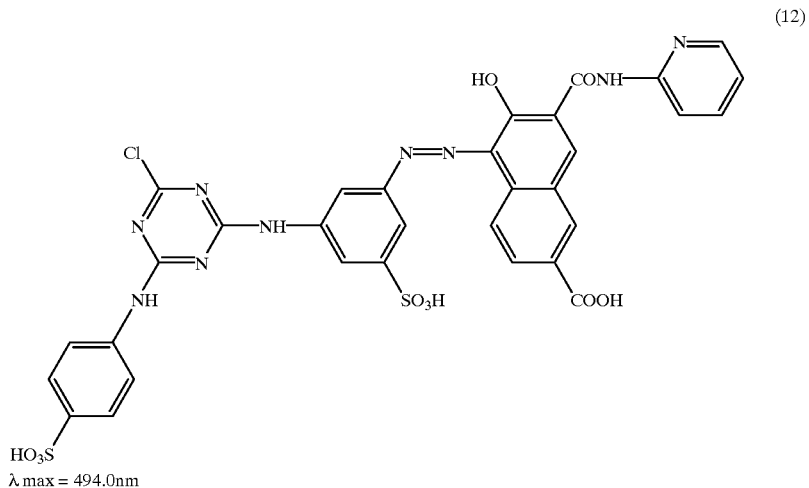

(12)

λ max = 494.0nm

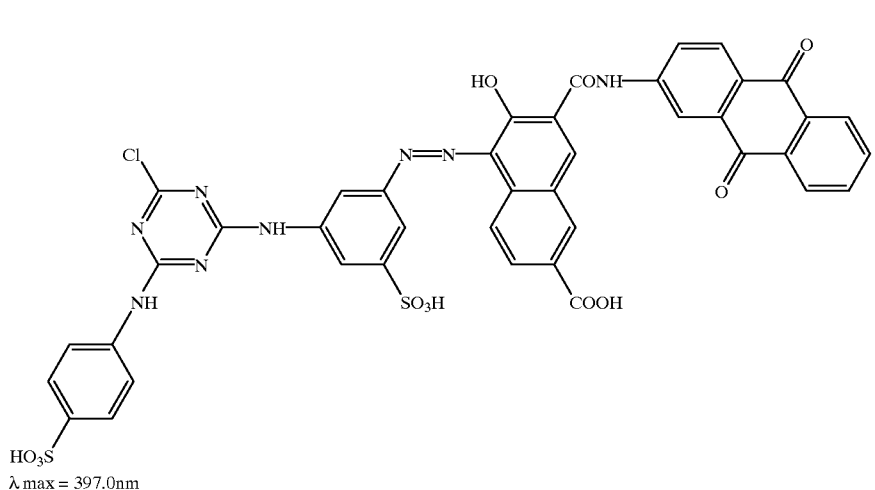

(13)

λ max = 397.0nm

Example 14

A monoazo compound represented by formula (14) was prepared as described in Example 1 with the exceptions that 36.4 g of 2-hydroxy-6-hydroxycarbonyl-3-benzothiazolylaminocarbonylnaphthalene was substituted for the 2-hydroxy-3-phenylaminocarbonyl-6-hydroxycarbonylnaphthalene in c) of Example 1 and that 400 g of 50% aqueous solution of 1-methyl-2-pyrrolidone was substituted for 300 g of water used in preparation of the aqueous coupler solution. The product was isolated by salting out with sodium chloride and filtration to obtain 63.6 g of red powdery crystals including sodium chloride.

This compound has excellent fiber-reactive dye properties, and thereby dyed cellulose fiber materials, for example cotton, by the usual dyeing procedures in deep yellowish orange exhibiting high fastness to chlorine, light, alkaline perspiration, and rubbing.

Figure 14:
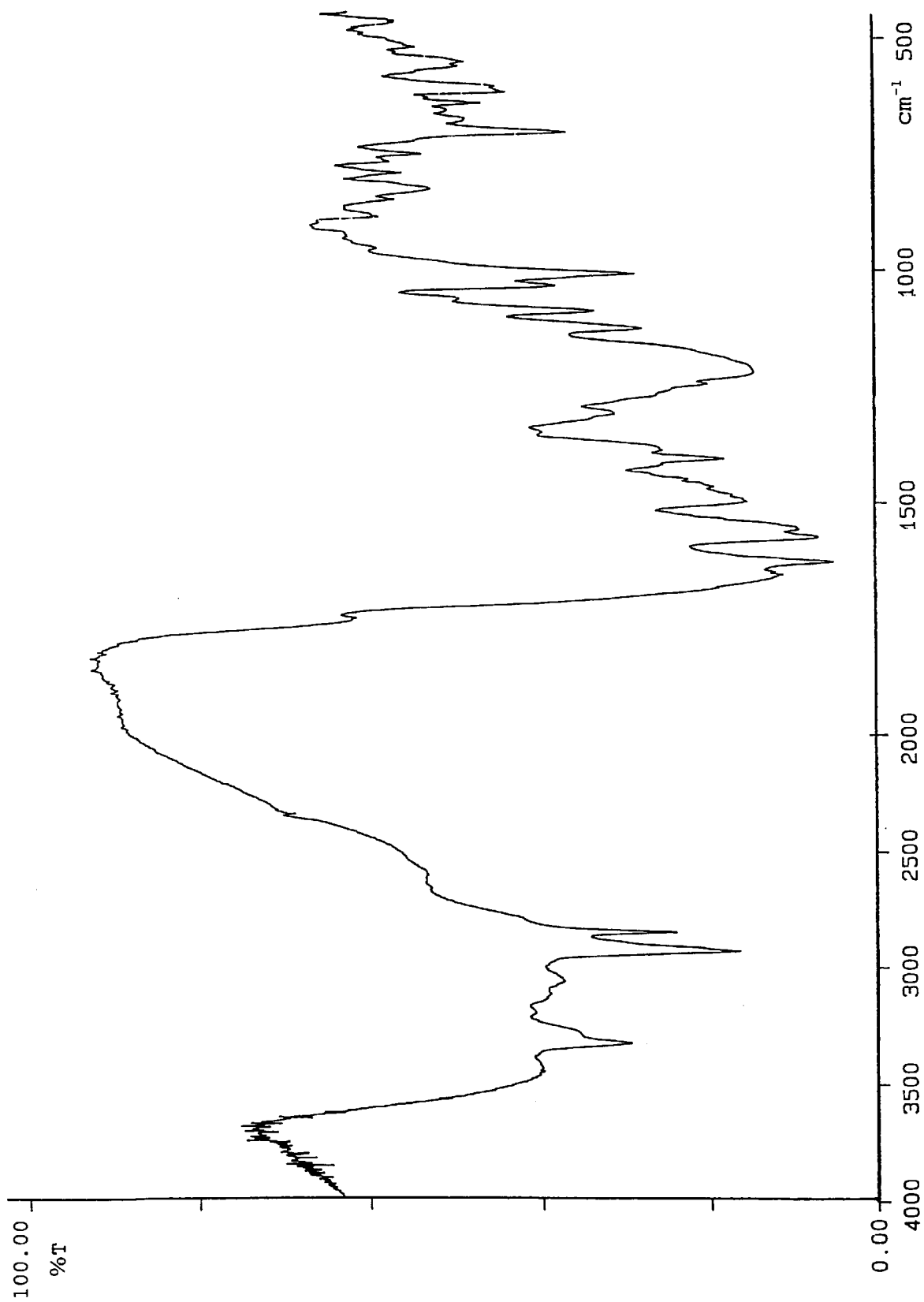
FIG. 14 is an infrared absorption spectrum of the azo compound obtained in Example 14.

An infrared absorption spectrum (the KBr method) of the red powdery crystals thus obtained is shown in FIG. 14.

Effects of the Invention and Industrial Applicability

By using as couplers 2-hydroxynaphthalenedicarboxylic acids having carboxyl groups or derivatives thereof at both of the 3- and 6-positions, water-soluble azo compounds can be obtained which have superior dyeing properties and fastness (fastness to washing, rubbing, perspiration and the like) compared to those obtained by using as couplers 2-hydroxynaphthalenemonocarboxylic acids having a carboxyl group only one of the 3- and 6-positions. In addition, such couplers allow easier regulation of color and vividness by appropriately selecting the carboxyl group or derivatives thereof.

Water-soluble compounds of the present invention can be used as dyes for fibers and other materials.

We claim:

1. A water-soluble azo compound represented by the general formula [I]:

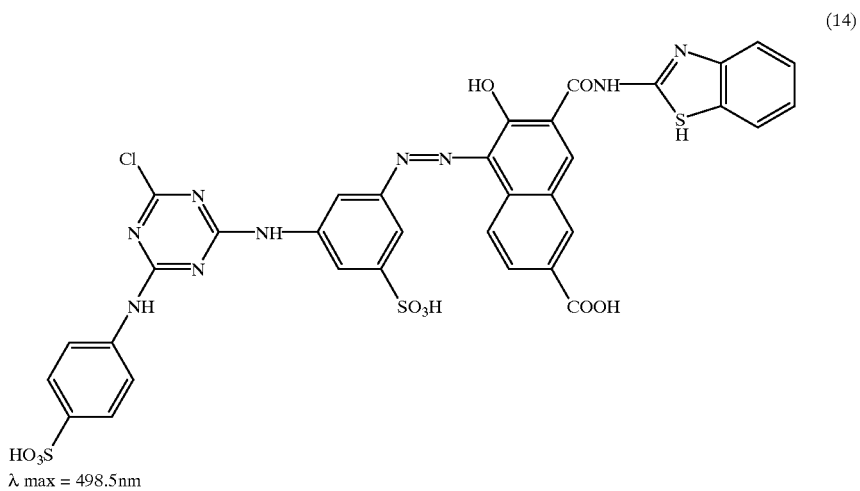

(14)

λ max = 498.5nm

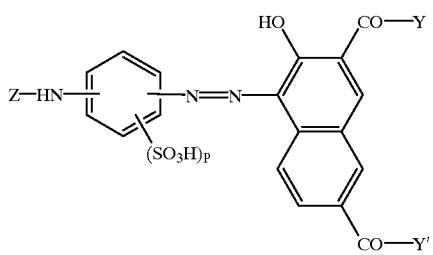
[I]

wherein, Y is —OM, —OR1, or —NH—X, and Y' is —OM', —OR1', or —NH—X', in which M and M' each represent a hydrogen atom or an alkali metal;

R1 and R1' each represent a group selected from an optionally branched saturated or unsaturated aliphatic hydrocarbon group having 1 to 6 carbon atoms, an optionally substituted cycloalkyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM';

p represents an integer 1 or 2;

Z is

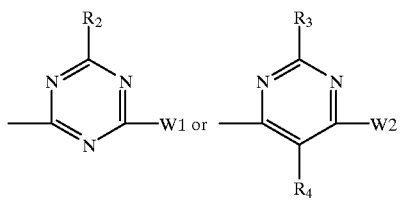

in which R2, R3 and R4 each represent a hydrogen atom or a halogen atom; and

W1 and W2 each represent a hydrogen atom, a halogen atom, or a group selected from

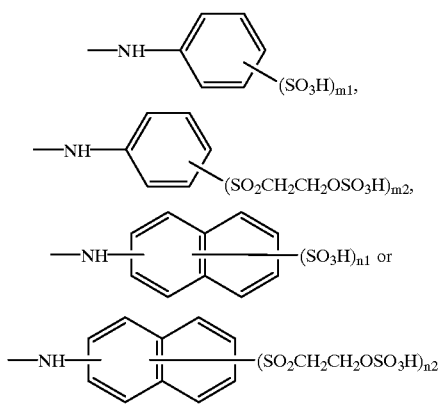

in which the aromatic rings may optionally have further substituent(s);

m1 and m2 each represent an integer 1 or 2, and n1 and n2 each represent an integer from 1 to 3.

2. A process for preparing a water-soluble azo compound according to claim 1, the process being characterized in that an amine represented by the general formula [II]:

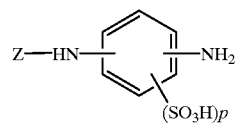
[II]

wherein p represents an integer 1 or 2;

Z is

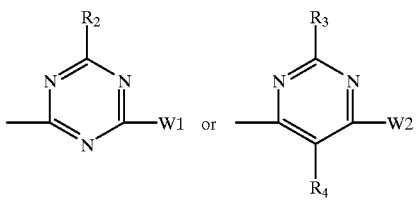

in which R2, R3 and R4 each represent a hydrogen atom or a halogen atom; and

W1 and W2 each represent a hydrogen atom, a halogen atom, or a group selected from

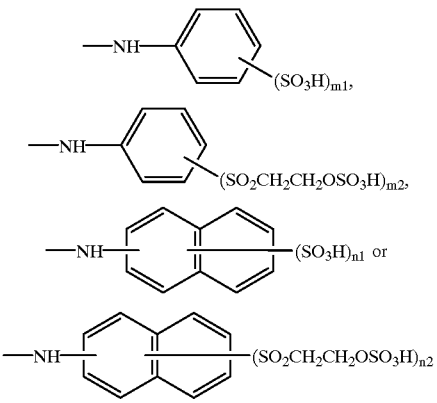

in which the aromatic rings may optionally have further substituent(s);

m1 and m2 each represent an integer 1 or 2, and n1 and n2 each represent an integer from 1 to 3;

is diazotized, and the resulting diazonium compound is coupled with a compound represented by the general formula [III]:

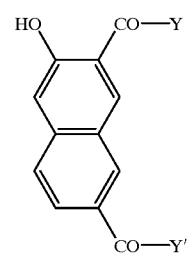
[III]

wherein Y is —OM, —OR1, or —NH—X, and Y' is —OM', —OR1', or —NH—X', in which M and M' each represent a hydrogen atom or an alkali metal;

R1 and R1' each represent a group selected from an optionally branched saturated or unsaturated aliphatic hydrocarbon group having 1 to 6 carbon atoms, an optionally substituted cycloalyl group having 3 to 6 carbon atoms, and an optionally substituted aromatic group; and X and X' each represent an optionally substituted aromatic group or an optionally substituted heterocyclic group having conjugated double bonds;

provided that at least one of Y and Y' represents —OM or —OM'.

3. A method for dyeing material comprising contacting the material with a sufficient quantity of a water-soluble azo compound of claim 1.

* * * * *